No. 805,015. PATENTED NOV. 21, 1905.
R. HAZELRIGG.
INSECT TRAP.
APPLICATION FILED JULY 15, 1905.
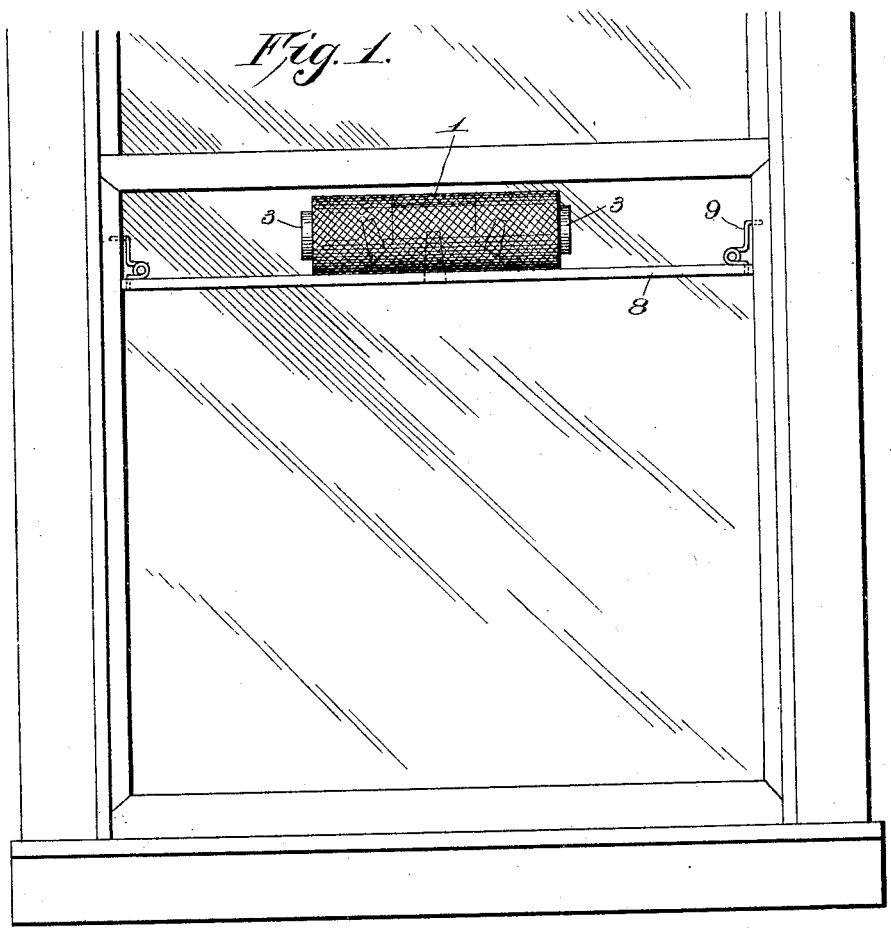
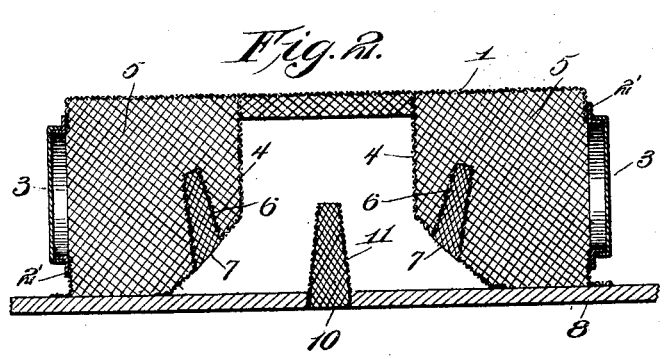
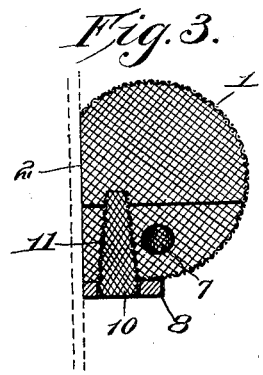
Inventor
Ross Hazelrigg
Witnesses
Louis D. Heinrichs
Herbert D. Lawson
By W. J. Fitzgerald
Attorneys

UNITED STATES PATENT OFFICE.

ROSS HAZELRIGG, OF EUREKA, CALIFORNIA.

INSECT-TRAP.

No. 805,015.  Specification of Letters Patent.  Patented Nov. 21, 1905.

Application filed July 15, 1905. Serial No. 269,840.

*To all whom it may concern:*

Be it known that I, ROSS HAZELRIGG, a citizen of the United States, residing at Eureka, in the county of Humboldt and State of California, have invented certain new and useful Improvements in Insect-Traps; and I do hereby declare the following to be a full, clear, and exact description of the invention, such as will enable others skilled in the art to which it appertains to make and use the same.

My invention relates to a combined fly escape and trap for use upon windows, screens, &c.; and its object is to provide a simple and inexpensive device of this character which can be readily attached to a window or screen and which has a novel arrangement of parts whereby flies after passing into the device cannot return and will either pass through the window or will move into a trap provided for them.

The invention consists of a casing formed, preferably, of wire fabric and which is supported by a ledge which may be detachably connected to a window-sash. An inlet-tube extends through the ledge and into the casing, and at opposite sides of the outlet end of this tube are walls also formed of wire fabric and having tubes extending from them into compartments from which insects cannot escape after once entering them.

The invention also consists in further novel construction and combination of parts hereinafter more fully described and claimed.

In the accompanying drawings I have shown the preferred form of my invention, and in said drawings—

Figure 1 is a front elevation showing a trap connected to a window-sash. Fig. 2 is a vertical longitudinal section through the trap, and Fig. 3 is a central vertical transverse section therethrough.

Referring to the figures by numerals of reference, 1 is the substantially cylindrical body of the trap, the same being formed of wire fabric and having one face cut away, as shown at 2, so that it can lie flat against a window-pane or against the fabric of a screen. Each end of the casing has a flanged ring 2′ connected to it, and this ring is adapted to be engaged by a removable cap 3. Partitions 4, formed of wire fabric, are located within the body 1 at opposite sides of the center thereof, and each of these partitions has its lower portion inclined upward and inward for a portion of its length and then along lines parallel with the transverse center of the body. Oppositely-disposed compartments 5 are therefore formed, one between each of the partitions 4 and the adjoining end of the body 1. Each of these compartments 5 has a back formed of netting. The inclined portion of each partition 4 has an inlet-tube 6 extending from it into its compartment 5, and this tube is arranged around an opening 7 formed within the partition. The body 1 is suitably fastened upon a ledge 8, formed of wood or other preferred material, and which is adapted to fit between the side bars of a window-sash and to be detachably connected thereto in any preferred manner.

In the drawings I have shown spring-hooks 9 connected to the ends of the ledge and projecting into engagement with the side bars of the sash. These hooks can be disengaged by pulling them toward each other, and the ledge can then be readily removed. An opening 10 is formed within the center of the ledge, and a frusto-conical tube 11 or wire fabric extends from this opening into the compartment formed between partitions 4.

As is well known, flies upon alighting on a vertical surface usually travel upward, and it will therefore be understood that by placing the ledge 8 upon the screen or window-pane, near the upper end thereof, the flies will travel upward against the ledge and will then pass through the tube 11 into the central compartment within the body 1. They will be attracted to this compartment because no wire fabric is located between the partitions 4 where the body contacts with the window. After the insects have entered this central compartment they cannot escape unless the glass has been cut away at points between the partition 4. If this has not been done, the flies will move into the tubes 6 and then into the compartments 5, from which they cannot escape. This device constitutes an efficient means for removing flies from rooms, and by reason of the novel means employed for securing it in place it can be very readily connected to any form of window sash or screen.

In the foregoing description I have shown the preferred form of my invention; but I do not limit myself thereto, as I am aware that modifications may be made without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. A device of the character described comprising a ledge, a body subdivided into a plurality of compartments and mounted on the ledge, an inlet opening into one of said compartments through the ledge, inlet-tubes extending from said compartment into the other compartments, and removable closures for the last-mentioned compartments.

2. A device of the character described comprising a supporting-ledge, a body mounted thereon and subdivided into central and end compartments, an inlet-tube extending through the ledge into the central compartment, inlet-tubes extending from the central compartment into the end compartments and closures for the end compartments.

3. A device of the character described comprising a ledge, means for securing the same to a supporting device, a body suitably secured upon the ledge and formed of metal fabric, said compartment being subdivided by fabric partitions into a central and end compartments, a fabric tubular inlet extending through the ledge into the central compartment and fabric tubular inlets extending from the partitions into the end compartments.

4. A device of the character described comprising a ledge, means for securing the same to a supporting device, a body suitably secured upon the ledge and formed of metal fabric, said compartment being subdivided by fabric partitions into a central and end compartments, a fabric tubular inlet extending through the ledge into the central compartment and fabric tubular inlets extending from the partitions into the end compartment and removable closures upon the end compartments.

5. The combination with a ledge and means for detachably securing the same to supports; of a body formed of metal fabric and secured upon the ledge, metal-fabric partitions within the body and subdividing the same into a central and end compartments, one wall of the body being removed between the fabric partitions, a tubular inlet extending through the ledge and into the central compartment, tubular inlets extending from the partitions into the end compartments, all of said tubes being formed of metal fabric, and closures detachably mounted upon the end compartments.

In testimony whereof I have signed my name to this specification in the presence of two subscribing witnesses.

ROSS HAZELRIGG.

Witnesses:
ARTHUR B. SHEARER,
GEO. B. WEATHERBY.